Patented Oct. 23, 1934

1,977,646

UNITED STATES PATENT OFFICE 1,977,646

METHOD OF ETCHING PLANOGRAPHIC PLATES AND COMPOSITION THEREFOR

George S. Rowell, Cleveland, Ohio, assignor to Multigraph Company, Wilmington, Del., a corporation of Delaware No Drawing. Application September 13, 1933, Serial No. 689,289

8 Claims. (Cl. 41—41.5)

This invention relates to an improved etching and dampening composition for planographic metal printing plates and it comprises an aqueous solution of nickel nitrate, ammonium nitrate and ammonium acid phosphate, glycerin, and sometimes, but not always or necessarily, an organic colloid thickener, and a method of using the same, all as more fully hereinafter described and particularly defined in the claims.

Ammonium phosphate, and particularly the dihydrogen, or primary or acid phosphate, has long been recognized as an effective agent for desensitizing zinc or aluminum printing plates. Ammonium nitrate or sodium nitrate is commonly used in conjunction with the phosphate to reduce the objectionable effervescence in the case of zinc and to increase the insolubility of the aluminum phosphate resulting from the reaction with aluminum.

These prior art compositions are considered as weak etches and not suited for use as dampening or fountain solutions during the printing of large editions. So far as I am aware, no explanation of the failure of these etches when used throughout the printing of large editions has been made. Yet it appears to be due to the fact that the metal—and particularly when, as is the common practice, it has previously been sensitized to acidic inks by the formation upon it of a film of a basic salt as by the treatment of zinc with a counteretching solution of nitric acid and alum, or of aluminum with a counteretching solution comprising sulphuric acid and a little copper chloride—may acquire, when reacted with etches comprising ammonium or sodium nitrate and ammonium phosphate, a gross increment of weight on such protracted contact with the etch as is required for printing large editions, this weight increment representing exuberant crystallization which is readily discernible under the microscope. Whatever phosphate of the metal is formed is not confined to a thin film but delevops crystalline excrescences which tend to entrap and mechanically hold ink on the non-printing areas.

It is an object of this invention to overcome the above-mentioned objectionable feature of these prior etches. Another purpose of this invention is to provide an etching composition which, by mere change in the concentration of its components, or some of them, may serve (1) as a strong desensitizing agent for the preparatory treatment of the plate before printing, or as a powerful scum-removing agent for cleaning a badly scummed plate at any time; (2) as a fountain solution suitable for protracted contact with the plate as in printing large editions; (3) as the dispersed phase of a dual-function emulsoid ink of the "water-in-oil" type whereby the dampening of the plate as a separate operation between successive inkings may be avoided. Other objects and advantages will become apparent as the description of this invention proceeds.

I have discovered as part of this invention that the addition of nickel nitrate to the ammonium or sodium nitrate in these prior acid-phosphate-containing etches prevents the formation of the aforementioned undesirable crystalline excrescences under conditions of surface, time, temperature and other factors affecting the reaction which would in the absence of the nickel nitrate allow their formation. For example, when zinc foils weighing circa 0.05 gram per sq. cm. of total surface and previously sensitized with a conventional nitric acid-alum counter-etch, are immersed in the improved etching solution of this invention comprising nickel nitrate, ammonium nitrate and ammonium acid phosphate in half molar solution, and other foils identical with the first mentioned are immersed in a prior etching solution, also half molar, consisting of ammonium nitrate, ammonium acid phosphate, and water, and both sets of foils in their respective solutions are held undisturbed for a period of twenty-four hours at the same temperature, the former will present a bright metallic surface and a mean weight increment of the order of 0.23% while the latter will be found to be encrusted with minute crystal masses and to have gained weight in the order of 2.9% or over ten times as much as the former.

I am aware that glycerin, ethylene glycol, and various gums, as arabic and tragacanth, have been heretofore included as components of ammonium phosphate etches for the purpose, on the part of the gums, of rendering the surface slightly more hydrophilic than the phosphate is capable of doing alone and, on the part of the glycerin, of rendering the surface dampened therewith hygroscopic and hence capable of retaining moisture under conditions of such low humidity as would in the absence of glycerin cause disadvantageously rapid drying of said surface.

I have discovered as part of this invention that the addition of ethylene glycol, or preferably glycerin, to my nickel nitrate-ammonium nitrate ammonium acid phosphate etch not only provides the advantages heretofore obtained as above noted but also effects a still further improvement, in that the glycerin-containing etch of this invention produces, under the conditions above described, no definitely ascertainable change in weight. Under like conditions, however, the addition of an equal amount of glycerin to the prior art ammonium nitrate-ammonium acid phosphate etch does not appreciably decrease the weight increment from that noted in the absence of the glycerin, i. e. 2.9%.

I consider the substantial elimination of the weight increment to be an advantage but not of itself a vital necessity, for it is merely a measure of the tenuousness of the phosphate film presumed to be formed on the metal surface. I consider the prime desideratum to be the prevention of a film which is capable, usually by reason of its rough crystalline character, of mechanically entrapping bits of extraneous ink.

For use as a preparatory etch, I prefer to make up my etching solution as follows:

| | Parts by volume |
|---|---|
| Ammonium acid phosphate, 0.5 molar, in distilled water | 9 |
| Ammonium nitrate, 0.5 molar, in distilled water | 1 |
| Nickel nitrate, 0.5 molar, in distilled water | 2 |
| C. P. glycerin | 3 |

For etching after the image has been delineated on the plate and for ordinary cleaning, I use the above etch; but when there is a heavy scum to be removed, I prefer to omit the glycerin from the above formula.

For use as a fountain or dampening solution for application to the plate between successive inkings of a large edition, I may add water, preferably distilled, to the preparatory etch as above given. When printing with an ordinary lithographic ink under usual atmospheric conditions, that is when the relative humidity is 30% or above, I prefer to retain in the diluted etch about 7.5% glycerin. This I may do by adding 25 parts of water to the 15 parts of etch as above formulated. If the relative humidity is lower than 30%, I prefer to retain a glycerin content of about 10% and therefore add but 15 parts of water to the described etch, as follows:

| | Parts by volume |
|---|---|
| Ammonium acid phosphate, 0.5 molar, in distilled water | 9 |
| Ammonium nitrate, 0.5 molar, in distilled water | 1 |
| Nickel nitrate, 0.5 molar, in distilled water | 2 |
| C. P. glycerin | 3 |
| Distilled water | 15 |

It is to be understood that the illustrative formula and the dilutions hereinabove given represent merely my own general preference and that they may be departed from by wide variations in the ratios of the components to meet the requirements of specific conditions without departing from the scope of this invention as defined in the claims.

Any one skilled in the art will appreciate the desirability of adjusting the glycerin ratio according as the prevailing relative humidity may render such adjustment desirable. Except when used as a cleaning fluid to remove heavy scum, the presence of glycerin in the etching solutions of this invention is always desirable. It will also be appreciated that the use of distilled water is of advantage but not always necessary.

Gum tragacanth, preferably the white ribbon variety, may sometimes be added in small amounts to the above-described fountain solution, but I advise against the use of gum arabic in any of the etching solutions of this invention because of the adverse effects of the impurities almost invariably associated with this commonly used gum.

For an ink repellent solution to be emulsified in a dual-function emulsoid ink of the water-in-oil type, I prefer to use 0.5 molar solutions of nickel nitrate, ammonium nitrate and ammonium acid phosphate in the proportions given above for the preparatory etch, with or without an additional thickening agent, preferably gum tragacanth and sometimes a preponderancy of glycerin.

As stated hereinabove, the addition of nickel nitrate to commonly used etches comprising ammonium nitrate and ammonium acid phosphate prevents the formation of the highly undesirable crystalline excrescences under conditions which would, in the absence of the nickel, allow their formation.

I recommend, for best results in printing large editions, that the ammonium acid phosphate content be adjusted so that the ratio of the nickel nitrate to ammonium phosphate closely approximates that in the illustrative formulas hereinabove set forth.

In prior art etches of the type just described, it is common practice to include a fluoride, as ammonium fluoride or ammonium silicofluoride. I have found the fluorides to be incompatible with the function of the nickel nitrate in combination with ammonium nitrate and ammonium acid phosphate, and I therefore do not recommend their use in the etches of this invention.

I claim:

1. A composition for etching and dampening planographic metal printing plates, comprising in aqueous solution an acid phosphate, ammonium nitrate, and nickel nitrate.

2. A composition for etching and dampening planographic metal printing plates, comprising in aqueous solutions ammonium dihydrogen phosphate, ammonium nitrate, and nickel nitrate.

3. A composition for etching and dampening planographic metal printing plates, comprising in aqueous solution an acid phosphate, ammonium nitrate, nickel nitrate and glycerin.

4. A composition for etching and dampening planographic metal printing plates, comprising in aqueous solution an acid phosphate, ammonium nitrate, nickel nitrate and an organic colloid.

5. Method of etching and dampening planographic metal printing plates, comprising as a step treating the non-printing portions with an aqueous solution of an acid phosphate, ammonium nitrate and nickel nitrate.

6. Method of etching and dampening planographic metal printing plates, comprising as a step treating the non-printing portions with an aqueous solution of ammonium dihydrogen phosphate, ammonium nitrate and nickel nitrate.

7. Method of etching and dampening planographic metal printing plates, comprising as a step treating the non-printing portions with an aqueous solution of an acid phosphate, ammonium nitrate, nickel nitrate and glycerin.

8. Method of etching and dampening planographic metal printing plates, comprising as a step treating the non-printing portions with an aqueous solution of an acid phosphate, ammonium nitrate, nickel nitrate and an organic colloid.

GEORGE S. ROWELL.